US012678784B2

(12) United States Patent
Mangan

(10) Patent No.: US 12,678,784 B2
(45) Date of Patent: Jul. 14, 2026

(54) TEST CARTRIDGE WITH ACTUATION MEMBER

(71) Applicant: Core Diagnostics Corporation, Georgetown, TX (US)

(72) Inventor: Wilma Mangan, Santa Clara, CA (US)

(73) Assignee: Core Diagnostics Corporation, Georgetown, TX (US)

( * ) Notice: Subject to any disclaimer, the term of this patent is extended or adjusted under 35 U.S.C. 154(b) by 1273 days.

(21) Appl. No.: 17/323,424

(22) Filed: May 18, 2021

(65) Prior Publication Data

US 2021/0362152 A1 Nov. 25, 2021

Related U.S. Application Data

(60) Provisional application No. 63/027,155, filed on May 19, 2020.

(51) Int. Cl.
*B01L 3/00* (2006.01)
*B01L 7/00* (2006.01)

(52) U.S. Cl.
CPC ... *B01L 3/502715* (2013.01); *B01L 3/502738* (2013.01); *B01L 7/525* (2013.01); *B01L 2200/027* (2013.01); *B01L 2200/04* (2013.01); *B01L 2200/0684* (2013.01); *B01L 2200/147* (2013.01); *B01L 2200/16* (2013.01); *B01L 2300/027* (2013.01); *B01L 2300/0627* (2013.01); *B01L 2300/0681* (2013.01); *B01L 2300/0816* (2013.01); *B01L 2300/0861* (2013.01); *B01L 2400/0481* (2013.01)

(58) Field of Classification Search
CPC ......... B01L 3/502715; B01L 3/502738; B01L 7/525; B01L 2200/027; B01L 2200/04; B01L 2200/0684; B01L 2200/147; B01L 2200/16; B01L 2300/027; B01L 2300/0627; B01L 2300/0681; B01L 2300/0816; B01L 2300/0861; B01L 2400/0481
See application file for complete search history.

(56) References Cited

U.S. PATENT DOCUMENTS

| | | | | | |
|---|---|---|---|---|---|
| 5,658,801 | A * | 8/1997 | Poissant | G01N 33/54366 436/514 |
| 5,770,458 | A * | 6/1998 | Klimov | G01N 33/543 435/7.1 |
| 8,012,770 | B2 * | 9/2011 | Siciliano | G01N 33/56916 436/805 |
| 9,034,657 | B2 * | 5/2015 | Rundstrom | G01N 33/6854 436/805 |
| 12,123,872 | B2 * | 10/2024 | Lee | G01N 33/538 |
| 2003/0175993 | A1 * | 9/2003 | Toranto | A61B 10/0051 435/7.1 |
| 2007/0134810 | A1 * | 6/2007 | Yang | B01L 3/5023 436/514 |

* cited by examiner

*Primary Examiner* — Ann Montgomery
(74) *Attorney, Agent, or Firm* — McGuireWoods LLP

(57) ABSTRACT

The methods and systems disclosed herein may relate to a testing cartridge. A system may include, a test cartridge comprising: a body comprising an upper component and a lower component, an inner cavity at least partially enclosed by the body, a sample port disposed in the upper component, a structural member disposed within the upper component relative to the sample port capable of controlling the contact between a sample and the sample pad, an assay coupled to the lower component, wherein the assay comprises a sample pad, and a membrane coupled to a portion of the structural member capable of pretreating the sample.

10 Claims, 2 Drawing Sheets

TEST CARTRIDGE WITH ACTUATION MEMBER

BACKGROUND

A multitude of assays may be performed on biological samples for diagnosis, screening, disease staging, forensic analysis, pregnancy testing, infection detection testing, drug testing, among other reasons. Current methods require that the sample be pretreated before being disposed within the testing cartridge comprising the assay. There may be several advantages to providing a test cartridge capable of pretreating the sample after the sample is disposed within the test cartridge. Additionally, there may be several advantages to providing a test cartridge capable of controlling the contact between a sample and a sample pad disposed on an assay.

It may be advantageous to pretreat a sample to remove an interfering substance in the sample. Additionally, in certain embodiments, it may be advantageous to alter the molecular composition of a sample thereby enhancing exposure to the sample analyte before it may come in contact with a specific test chemistry. In typical lateral flow tests, pretreatment chemistries are impregnated on a membrane pad below a sample port, or a pre-treatment step may be done off-line in a separate step by adding a sample to a buffer. This adds additional complexity to the assay system which may increase the possibility of errors. Thus, there is a need to efficiently pre-treat a sample without addition steps.

SUMMARY

Figure 1:
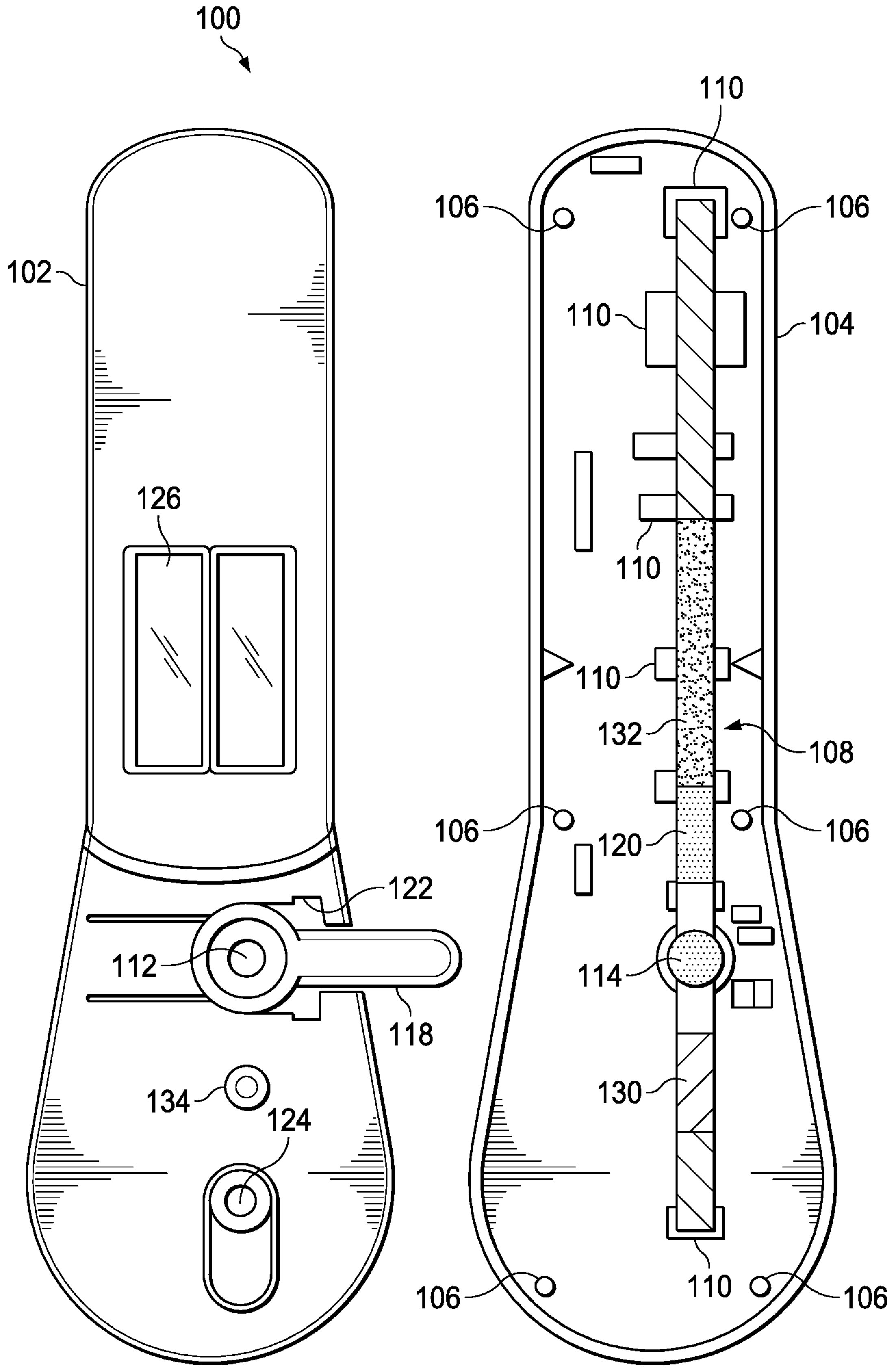
FIG. 1 illustrates an embodiment of an expanded view of a test cartridge.

Provided are test cartridges for testing samples in accordance with the disclosure. An example embodiment of a test cartridge comprises a body comprising an upper component and a lower component; an inner cavity at least partially enclosed by the body; a sample port disposed in the upper component; a structural member disposed within the upper component relative to the sample port capable of controlling the contact between a sample and the sample pad; an assay coupled to the lower component, wherein the assay comprises a sample pad; and a membrane for pretreating the sample, wherein the membrane is configured to be decoupled from the assay by actuation of the structural member.

Additionally or alternatively, the test cartridge may include one or more of the following features individually or in combination. The assay may be a lateral flow assay. The assay may comprise a permeable matrix of material. The membrane pretreatment may be selected from the group consisting of filtration, pH adjustment, viscosity adjustment, buffer exchange, interferent entrapment, addition of biological chemistries such as enzymes or antibodies or antigens, and any combination thereof. The membrane may comprise trapping agents to be added to the sample, wherein the trapping agents are selected from the group consisting of antibodies, enzymes, precipitating agents, polymers, and any combination thereof. The structural member may comprise an articulating joint selected from the group consisting of a ball and socket joint, a hinge joint, a living hinge joint, a condyloid joint, a pivot joint, a gliding joint, a saddle joint, spring, and any combination thereof. The structural member may be actuated by manual actuation, electronic actuation, mechanical actuation, or any combination of actuation mechanisms. The body may comprise a reagent port. A reagent may be added through the reagent port, wherein the reagent comprises a buffer, a detergent, filtration, pH adjustment, viscosity adjustment, buffer exchange, interferent entrapment, addition of biological chemistries such as enzymes or antibodies or antigens, and any combination thereof. The sample may be a whole blood sample.

Provided are methods for testing samples in accordance with the disclosure. An example embodiment of a method comprises adding a sample to a sample port within an upper component of a test cartridge, pretreating the sample on a membrane, actuating a structural member to couple the membrane to an assay, and testing the sample on the assay.

Additionally or alternatively, the test cartridge may include one or more of the following features individually or in combination. The assay may be a lateral flow assay. The assay may comprise a permeable matrix of material. The membrane pretreatment may be selected from the group consisting of filtration, pH adjustment, viscosity adjustment, buffer exchange, interferent entrapment, addition of biological chemistries such as enzymes or antibodies or antigens, and any combination thereof. The membrane may comprise trapping agents to be added to the sample, wherein the trapping agents are selected from the group consisting of antibodies, enzymes, precipitating agents, polymers, and any combination thereof. The structural member may comprise an articulating joint selected from the group consisting of a ball and socket joint, a hinge joint, a living hinge joint, a condyloid joint, a pivot joint, a gliding joint, a saddle joint, spring, and any combination thereof. The structural member may be actuated by manual actuation, electronic actuation, mechanical actuation, or any combination of actuation mechanisms. The test cartridge may comprise a reagent port. The method may further comprise adding a reagent through the reagent port, wherein the reagent comprises a buffer, a detergent, filtration, pH adjustment, viscosity adjustment, buffer exchange, interferent entrapment, addition of biological chemistries such as enzymes or antibodies or antigens, and any combination thereof. The sample may be a whole blood sample.

DETAILED DESCRIPTION

Figure 2:
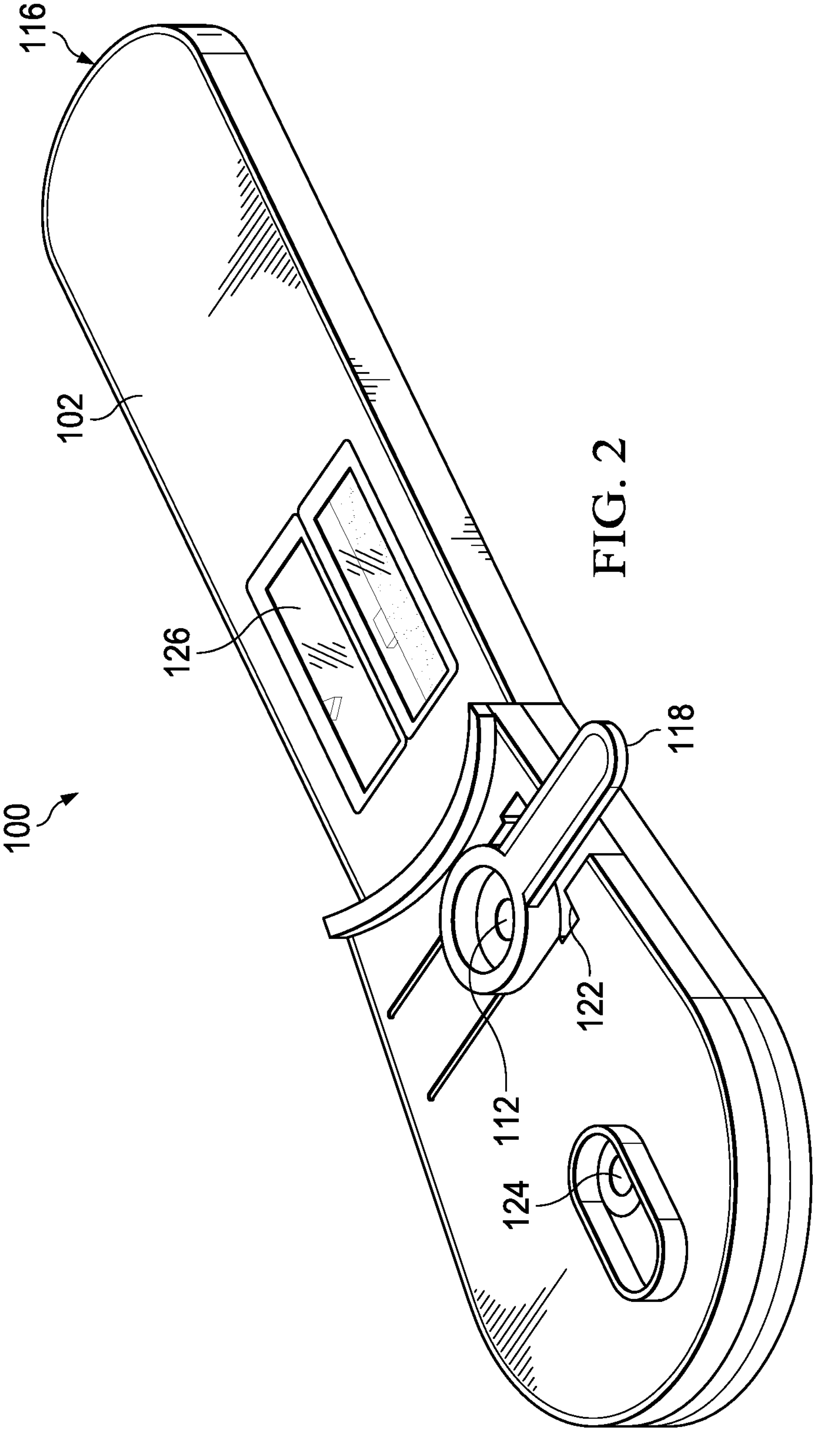
FIG. 2 illustrates an embodiment of a test cartridge.

FIGS. 1 and 2 illustrate an embodiment of test cartridge 100. The test cartridge 100 may be formed from an upper component 102 and a lower component 104, which may be fastened together thereby forming a body 116 (illustrated in FIG. 2) having an internal cavity. The internal cavity may be at least partially defined by the enclosed body 116. In certain embodiments, the internal cavity may be wholly enclosed by body 116.

In an embodiment, the upper component 102 and the lower component 104 may comprise mating parts 106 such that the upper component 102 and the lower component 104 may be interlocked together without additional means. Optionally, the upper component 102 and the lower component 104 may be fastened together via any suitable means including, but not limited to, adhesives, fasteners, the mating parts 106, ultra-violet curing agents, the like, and/or any combinations thereof. The upper component 102 and the lower component 104 may be formed in any suitable manner and should not be limited herein. In a non-limiting example, the upper component 102 and the lower component 104 may be formed by any suitable method including, but not limited to, extrusion, injection molding, molding, plasma etching, the like, and/or any combinations thereof. In a non-limiting example, the solid support may be a hydrophobic plastic, it may be treated by art-known methods to render the surfaces hydrophilic, such as by plasma etching and by corona treatment. Alternatively, a commercially available molded solid support can be used in the practice of the invention.

In an embodiment, an assay 108 or a plurality of assays 108 may be pre-loaded into the test cartridge 100 before the upper component 102 and the lower component 104 may be fastened together. Optionally, a bilateral assay 108 or a plurality of bilateral assays 108 may be pre-loaded into the test cartridge 100 before the upper component 102 and the lower component 104 may be fastened together.

Any suitable assay 108 may be used and should not be limited herein. In a non-limiting example, assay 108 may be a lateral flow assay, the like, and/or any combinations thereof. In a non-limiting example, assay 108 may comprise a sample pad 120, a membrane 114, a conjugate pad (not shown), a transport membrane (not shown), a test line (not shown), a control line (not shown), and an absorbent pad (not shown), a buffer pad 130, and a test capture zone 132. Any suitable conjugate pad may be used and should not be limited herein. Any suitable transport membrane may be used and should not be limited herein. Any suitable test line may be used and should not be limited herein. Any suitable control line may be used and should not be limited herein. Any suitable absorbent pad may be used and should not be limited herein.

In an embodiment, an assay 108 may be fastened to the lower component 104. Any suitable fastener 110 capable of holding the assay 108 at a specific location within the inner cavity may be used and should not be limited herein. Suitable fasteners 110 may include, but are not limited to, press fit brackets, grooves, cavities, adhesives, the like, and/or any combinations thereof. The assay 108 or the plurality of assays 108 may be in any suitable arrangement for a given application and should not be limited herein.

In an embodiment, assay 108 may comprise a sample pad 120 or a plurality of sample pads 120. Any suitable sample pad 120 capable of receiving a biological sample may be used. In a non-limiting example, the sample pad 120 may comprise a permeable matrix of material. In an embodiment, sample pad 120 may comprise an absorbent material or a non-absorbent material. In an embodiment, sample pad 120 may comprise a hydrophilic material. In an embodiment, sample pad 120 may comprise a woven material, a non-woven material, and/or any combinations thereof. In a non-limiting example, suitable materials for the matrix may include, but are not limited to glass fiber, nylon, rayon, cotton, acrylic and polyester and/or any combination of the like.

The upper component 102 of the test cartridge 100 may comprise a sample port 112. The sample port 112 may be of any size and shape capable of receiving a sample and contacting the sample with a membrane 114. The membrane 114 may be any membrane capable of pretreating the sample. Suitable pretreatments may include, but are not limited to, filtration, pH adjustment, viscosity adjustment, buffer exchange, interferent entrapment, addition of biological chemistries such as enzymes or antibodies or antigens, the like, and/or any combinations thereof. Optionally, membrane 114 may function to add detergents thereby improving wetting. Optionally, membrane 114 may be used as a filter to remove interfering agents from the sample based on size exclusions. Optionally, membrane 114 may be used as a filter to remove interfering agents from the sample based on parameters other than size including, but not limited to, pore size, entrapment using antibodies, polymers, other agents to form a complex or precipitation, the like, and/or any combinations thereof. Optionally, membrane 114 may function as a filter and may trap unbound antibodies, clotting agents, and the like, and/or any combinations thereof. Optionally, the membrane may be used to add trapping agents such as antibodies, enzymes, precipitating agents, polymers, the like, and/or any combinations thereof to the biological sample. The membrane 114 may comprise trapping chemistries to minimize false positive and false negative results. In certain embodiments, the membrane 114 may be a single membrane 114, a plurality of membranes 114 stacked atop one another, the like, and/or any combinations thereof. Suitable membranes 114 may include, but are not limited to, gauze, cellulose, cellulose acetate, other polyesters, glass fibers, nylon, nitrocellulose, other porous membranes, the like, and/or any combinations thereof.

The assay 108 may further comprise a buffer pad 130. The buffer pad 130 is the portion of the assay 130 in which a buffer or reagent may be applied to the assay 108 via the buffer or reagent port 114.

The assay 108 may further comprise a test capture zone 132. The test capture zone 132 is the portion of the assay 108 where antibody or viral detection may occur.

The upper component 102 may further comprise a structural member 118 disposed therein at a location relative to the sample port 112. Any structural member 118 capable of controlling the contact between the membrane 114 and a sample pad 120 or a plurality of sample pads 120 for use in a lateral flow assay 108 or a plurality of lateral flow assays 108 may be used and should not be limited herein. In certain embodiments, the structural member 118 may be a lever, a cantilever, a paddle, a button to press, the like, and/or any combinations thereof. The structural member 118 may be pivotally connected to the upper component 102 of body 116 via an articulating joint (not shown) thereby enabling reciprocating movement of the structural member 118. Suitable articulating joints may include, but are not limited to, a ball and socket joint, a hinge joint, a living hinge joint, a condyloid joint, a pivot joint, a gliding joint, a saddle joint, spring, the like, and/or any combinations thereof. In a non-limiting example, the structural member 118 may be formed with the upper component 102 of the body 116 as a single piece. A living hinge may also be formed at the structural member-upper component of the body interface 122, thereby enabling the structural member 118 of reciprocating motion (referring to FIG. 1). In another non-limiting example, the structural member 118 and the upper component 102 of the body 116 may be formed of two separate pieces that may be pivotally connected via an articulating joint, thereby enabling the structural member 118 of reciprocating motion (referring to FIG. 2).

In certain embodiments, the reciprocating movement of the structural member 118 may be manually actuated, electronically actuated, mechanically actuated, the like, and/or any combinations thereof. Actuating the structural member 118 may result in associating the membrane 114 with a sample pad 120 or a plurality of sample pads 120, dissociating the membrane 114 with a sample pad 120 or a plurality of sample pads 120, and/or any combinations thereof. Association and dissociation of the membrane 114 with the sample pad 120 may be depend on the assay 108. One of ordinary skill in the art, along with the present disclosure may be capable of determining the appropriate method (i.e. association, dissociation, and/or any combinations thereof) for a given assay 108. The structural member 118 may be actuated at a predetermined time after the sample has been disposed within the sample port 112, wherein the predetermined time may be specific to a given test or set of tests. The efficiency of the membrane 114 in removing interferants may be increased by allowing the samples to have a longer residence time during the pretreatment phase of the assay test on the membrane 114. The structural member 118 thus determines the degree of how much pretreatment of the samples occurs before the assay is begun.

The upper component 102 may further comprise a reagent port 124 capable of introducing an additional reagent into the sample. The reagent port 124 may be of any suitable shape and size and should not be limited herein. The reagent port 124 may be located on the upper component 102 at a location relative to the sample pad 120 location. In a non-limiting example, the upper component 102 may comprise one or more reagent ports 124 and should not be limited herein. Additional reagents may include, but are not limited to, a buffer, a detergent, filtration, pH adjustment, viscosity adjustment, buffer exchange, interferent entrapment, addition of biological chemistries such as enzymes or antibodies or antigens, the like, and/or any combinations thereof.

The upper component 102 may further comprise a results viewing window 126. The results viewing window 126 may be located within the upper component 102 at a location such that the results of the assay 108 or plurality of assays 108 may be visually analyzed. The results viewing window 126 may be of any suitable size and shape and should not be limited herein. In a non-limiting example, the results viewing window 126 may comprise a transparent shield comprised of hard plastic, a film, glass, other transparent materials, the like, and/or any combinations thereof.

The upper component 102 and the lower component 104 may be fastened together thereby forming a test cartridge 100 comprising a body 116 and an internal cavity. In an embodiment, the internal cavity may be inaccessible by a user.

The body 116 may be of any suitable size and shape and should not be limited herein. Suitable shapes may include, but are not limited to, rectangle, oval, square, circle, semicircle, the like, and/or any combinations thereof. Body 116 may be formed of any suitable material capable of protecting the contents of the inner cavity (not shown) from interruptions and deformation. Suitable materials may include, but are not limited to, polymers, elastomers, metals, metal alloys, composite materials, the like, and/or any combinations thereof.

The body 116 may be made from a suitable material that may be selected based on its properties including, but not limited to, thermal conductivity, clarity for optical transmission, mechanical properties for easy welding, surface properties that may allow for uniform coating and stability of reagent, neutrality to the liquid medium to prevent interference with the assay 108, the like, and/or any combinations thereof. In certain embodiments, suitable materials may include plastics with high free surface energies and low water sorption. In an embodiment, suitable materials may include, but are not limited to, polyester, polyethylene terephthalate glycol-modified, polyethylene terephthalate, polyethylene terephthalate, polybutylene terephthalate, polytrimethylene terephthalate, polyethylene naphthalate, polycarbonate, polyvinyl chloride, polystyrene, styrene-acrylonitrile resin (SAN), acrylonitrile-butadiene-styrene (ABS), the like, and/or any combinations thereof.

In an embodiment, the body 116 may further comprise a locking mechanism (not shown) capable of locking the structural member 118 and in turn the membrane 114 in place after actuation. In a non-limiting example, the structural member 118 may be locked into position such that the membrane 114 may remain in contact with the sample pad. Optionally, the structural member 118 may be locked into position after actuation such that the membrane 114 may not contact the sample pad. Any suitable locking mechanism may be used and should not be limited herein. In an embodiment, the locking mechanism may be disposed anywhere on or within the testing cartridge 100 and should not be limited herein.

In an embodiment, the test cartridge 100 described herein may be used to perform an assay 108 or a plurality of assays 108 on a sample. The test cartridge 100 may be a single use test cartridge 100 for use at home or in a clinic setting. First, a biological sample may be obtained. As used herein, it should be understood that "biological sample" and "sample" may be used interchangeably. A biological sample may be sourced from mammals and non-mammals. Examples of mammals include, but are not limited to, any member of the Mammalian class: humans, non-human primates such as chimpanzees, and other apes and monkey species; farm animals such as cattle, horses, sheep, goats, swine; domestic animals such as rabbits, dogs, and cats; laboratory animals including rodents, such as rats, mice and guinea pigs, and the like. Examples of non-mammals include, but are not limited to, birds, fish and the like. The term does not denote a particular age or gender.

In an embodiment, the sample may be obtained by a user. The user may be a health care professional, a human subject, or another human in close proximity to the subject. Any suitable biological sample from a subject of interest may be obtained including, but not limited to, urine, blood, saliva, tissue, the like, and/or any combinations thereof. Biological samples may be collected in any suitable manner including, but not limited to, oropharyngeal swab, nasopharyngeal swab, whole blood collection devices, vacutainers, capillary tubes, urine collection cups, fecal virginal smears, the like, and/or any combinations thereof.

Once the sample has been collected, the sample may then be disposed in the sample port 112. The sample may be disposed in the sample port 112 by any suitable manner and should not be limited herein. In a non-limiting example, the sample may be disposed within sample port 112 via a fingerstick, directly from the subject, a transfer pipet, a pipet tip, a dropper, the like, and/or any combinations thereof.

After the sample may be disposed within the sample port 112, the sample may then contact a membrane 114. The membrane 114 may then be used to pretreat the sample. In a non-limiting example, the sample may be a whole blood sample and the membrane may be a filter stack based on size. As the whole blood sample may contact the membrane, the structural member 118 may be actuated thereby associating the membrane 114 with a sample pad. In a non-limiting example, membrane 114 may be associated with the sample pad before the whole blood sample may contact the membrane 114. In a non-limiting example, membrane 114 may be associated with the sample pad after the whole blood sample may contact the membrane 114. As the whole blood sample flows through the membrane, the red blood cells may be separated from the plasma. In an embodiment, the red blood cells may be trapped within the membrane and the plasma may flow through the membrane and accumulate on the sample pad. After a predetermined amount of time, the structural member 118 may be actuated again thereby dissociating the membrane 114 from the sample pad. Dissociating the membrane 114 from the sample pad 120 may reduce the probability of red blood cells flowing through the assay 108 and in turn interfering with the assay 108 results. Next, a buffer may be introduced to the sample pad 120 by way of the reagent port. Once the buffer contacts the sample pad, the sample comprising plasma that may be essentially free of red blood cells may then flow up the assay 108 and the test may be performed. Once the assay 108 is complete, the results of the assay 108 may be detected and analyzed via the results viewing window 126. In an embodiment, the results of assay 108 may be detected in any suitable manner and should not be limited herein. The results may be analyzed in any suitable manner and should not be limited herein. Optionally, the results may be recorded, stored, and/or further analyzed in an off-site information handling system.

In another non-limiting example, the sample may be saliva and the membrane may be used to pre-treat the sample with a detergent. First, the saliva sample may be disposed within the sample port 112. The saliva may then contact the membrane 114 for a predetermined amount of time thereby allowing the detergent to break-up the saliva into smaller particles. After the predetermined amount of time, the structural member 118 may be actuated thereby associating the membrane 114 with the sample pad. The pretreated sample may then flow up the assay 108 and the test may be performed. Once the assay 108 is complete, the results of the assay 108 may be detected and/or analyzed via the results viewing window 126. In a non-limiting example, an imaging device may be used to detect and/or analyze the results of the assay 108. In an embodiment, the results of assay 108 may be detected in any suitable manner and should not be limited herein. The results may be analyzed in any suitable manner and should not be limited herein. Optionally, the results may be recorded, stored, and/or further analyzed in an off-site information handling system.

The body 116 may comprise a visual window 134 in the upper component 116 which may allow viewing to determine if an adequate amount of sample was collected and applied to the test cartridge 100.

The figures (FIGS.) and the above description may relate to embodiments of the present disclosure by way of illustration only. It may be noted that from the above disclosure, alternative embodiments of the structures and methods disclosed herein may be readily recognized as viable alternatives that may be employed without departing from the principles of what is claimed.

The figures depict embodiments of the disclosed system (or method) for purposes of illustration only. One skilled in the art, along with the present disclosure, may recognize that alternative embodiments of the structures and methods illustrated herein may be employed without departing from the principles described herein.

As used herein any reference to "one embodiment," "an embodiment," or "some embodiments" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article or apparatus that comprises a list of elements may not necessarily be limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This may be done merely for convenience and to give a general sense of the disclosure. This description may be read to include one and/or at least one and the singular also includes the plural unless it is obvious that it may be meant other-wise.

The invention claimed is:

1. A test cartridge comprising:

a body comprising an upper component and a lower component;

an inner cavity at least partially enclosed by the body;

a sample port disposed in the upper component;

a structural member disposed on the upper component relative to the sample port, the structural member pivotally connected to the upper component via an articulating joint enabling reciprocating movement of the structural member to provide contact between a sample and the sample pad, wherein the structural member comprises an orifice for delivering the sample to the sample port;

an assay coupled to the lower component, wherein the assay comprises a sample pad; and a membrane for pretreating the sample, wherein the membrane is configured to be decoupled from the assay by actuation of the structural member.

2. The test cartridge of claim 1, wherein the assay is a lateral flow assay.

3. The test cartridge of claim 1, wherein the assay comprises a permeable matrix of material.

4. The test cartridge of claim 1, wherein the membrane pretreatment is selected from the group consisting of filtration, pH adjustment, viscosity adjustment, buffer exchange, interferent entrapment, addition of biological chemistries including enzymes or antibodies or antigens, and any combination thereof.

5. The test cartridge of claim 1, wherein the membrane comprises trapping agents to be added to the sample, wherein the trapping agents are selected from the group consisting of antibodies, enzymes, precipitating agents, polymers, and any combination thereof.

6. The test cartridge of claim 1, wherein the articulating joint is selected from the group consisting of a ball and socket joint, a hinge joint, a living hinge joint, a condyloid joint, a pivot joint, a gliding joint, a saddle joint, spring, and any combination thereof.

7. The test cartridge of claim 1, wherein the structural member is actuated by manual actuation, electronic actuation, mechanical actuation, or any combination thereof.

8. The test cartridge of claim 1, wherein the body comprises a reagent port.

9. The test cartridge of claim 8, further comprising a reagent to be added through the reagent port, wherein the reagent comprises a buffer, a detergent, filtration, pH adjustment, viscosity adjustment, buffer exchange, interferent entrapment, addition of enzymes addition of antibodies, addition of antigens, and any combination thereof.

10. The test cartridge of claim 1, wherein the sample is a whole blood sample.

* * * * *